United States Patent [19]
Hirose et al.

[11] Patent Number: 5,298,199
[45] Date of Patent: Mar. 29, 1994

[54] OPTICAL BIREFRINGENCE COMPENSATOR ADAPTED FOR LCD

[75] Inventors: Shinichi Hirose, Isehara; Jean F. Clerc, Machida, both of Japan

[73] Assignee: Stanley Electric Co., Ltd., Tokyo, Japan

[21] Appl. No.: 774,870

[22] Filed: Oct. 11, 1991

[30] Foreign Application Priority Data
Oct. 17, 1990 [JP]  Japan .................. 2-278308

[51] Int. Cl.$^5$ ............................... G02F 1/1333
[52] U.S. Cl. ............................ 264/2.6; 428/1; 359/73
[58] Field of Search .......... 359/73; 264/2.6; 428/1

[56] References Cited

U.S. PATENT DOCUMENTS

| | | | |
|---|---|---|---|
| 4,385,806 | 5/1983 | Fergason | 359/73 |
| 4,514,452 | 4/1985 | Tanaka et al. | 428/910 |
| 4,701,028 | 10/1987 | Clerc | 350/337 |
| 4,813,770 | 3/1989 | Clerc et al. | 359/73 |

FOREIGN PATENT DOCUMENTS

| | | |
|---|---|---|
| 0239433 | 9/1987 | European Pat. Off. |
| 239433 | 9/1987 | European Pat. Off. |
| 0367288 | 5/1990 | European Pat. Off. |
| 0376696 | 7/1990 | European Pat. Off. |
| 58-171407 | 10/1983 | Japan . |
| 1462978 | 1/1977 | United Kingdom . |

Primary Examiner—Alexander S. Thomas
Attorney, Agent, or Firm—Nixon & Vanderhye

[57] ABSTRACT

Ionomer resin sheet is stretched in one direction in the plane of sheet to give uniaxial anisotropy, and then heated above the melting point under pressure to cause relaxation of the anisotropy. After cooling, a sheet of biaxial anisotropy is obtained. The degree of anisotropy depends on the initial stretching, heating temperature, heating time and pressure.

5 Claims, 6 Drawing Sheets

OPTICAL BIREFRINGENCE COMPENSATOR ADAPTED FOR LCD

BACKGROUND OF THE INVENTION

1. Field of the Invention

This invention relates to an optically anisotropic device and production method thereof. More particularly, the present invention relates to a biaxial optical anisotropy device which will be suitable for compensating for optical anisotropy of a liquid crystal cell of a liquid crystal display (LCD) device and production method thereof.

2. Description of the Related Art

A homeotropic orientation type liquid crystal display device has been utilized as a kind of liquid crystal display device. The structure and characteristics of this device will be explained with reference to FIGS. 6, 7 and 8 of the accompanying drawings.

Figure 6:
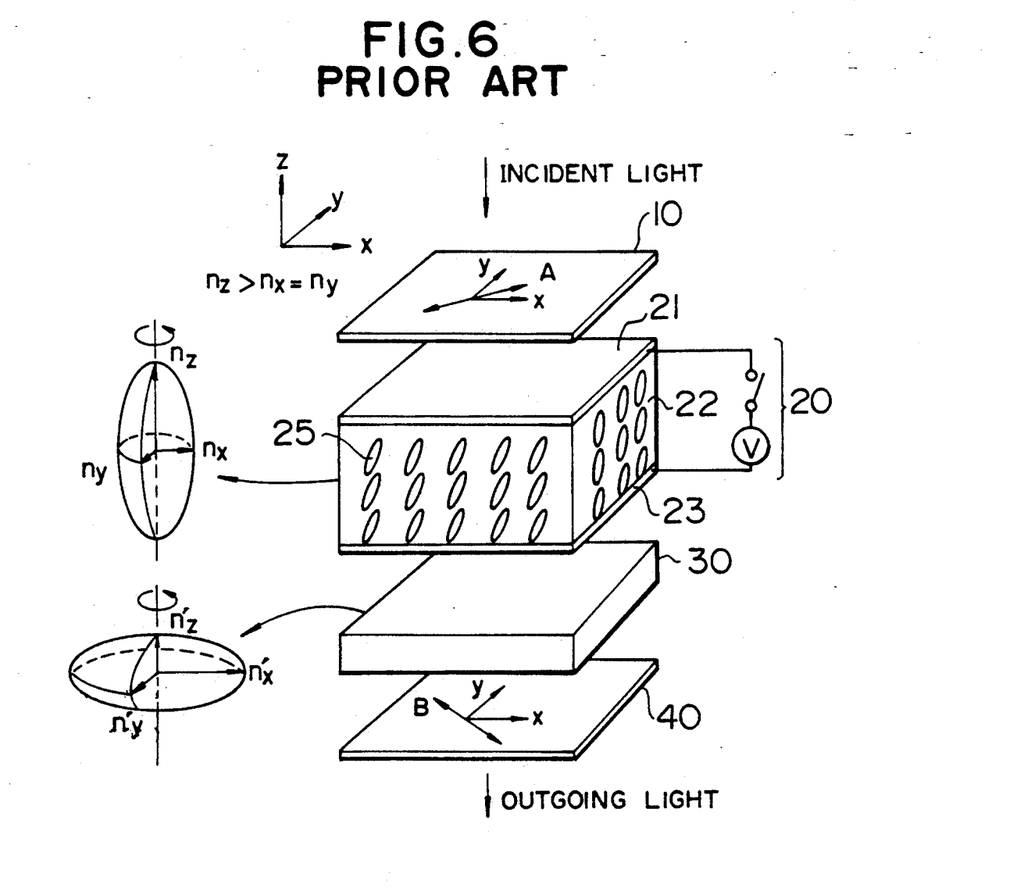
FIG. 6 is a perspective view showing diagramatically the structure of a liquid crystal display device in accordance with a prior art.

FIG. 6 is an explanatory view for explaining the principle of display in one pixel of a conventional homeotropic orientation type liquid crystal display device. In the drawing, -z direction is a light transmission direction, and x and y axes cross orthogonally each other and also cross orthogonally the z axis. Polarizers 10 and 40 are disposed in parallel with each other in such a manner that their polarization axes (represented by arrows A and B) cross orthogonally each other and form an angle of 45° with the x and y axes. A homeotropic orientation type liquid crystal cell 20 is sandwiched between these polarizers 10 and 40. The liquid crystal cell 20 comprises transparent glass substrates 21, 23 equipped with transparent electrodes and disposed in parallel with each other, and a liquid crystal layer 22 sandwiched between the substrates 21 and 23.

The liquid crystal has a tilt angle which is slightly inclined in the x direction from the z axis. Molecules 25 of the liquid crystal 22 are oriented substantially perpendicularly to the substrates under the state where no voltage is applied. The light which is polarized in the direction A in the polarizer 10 does not receive any action in the liquid crystal layer 22 and is incident on the other polarizer 40. The transmitted light is blocked because the polarizing direction B of the polarizer 40 crosses orthogonally the polarizing direction A of the polarizer 10. For this reason, when the pixel is viewed from the z axis direction of the liquid crystal display device, it appears dark.

Under the voltage application state, the liquid crystal molecules 25 exhibit a greater tilt angle particularly at the center portion of the liquid crystal layer. The liquid crystal layer exhibits birefringence under this state. The light transmitting through the polarizer 10 receives the action of birefringence when it passes through the liquid crystal layer 22 and is incident into the polarizer 40. The action of birefringence becomes maximal when the polarization axis A makes 45° with the x axis along which the tilt angle exists. Therefore, among the rays of light incident into the polarizer 40, a part of them passes through the polarizer 40, and the pixel becomes bright when viewed from the z axis direction of the liquid crystal display device.

The explanation given above deals with the case where the light travels along the z axis. When an operator of the liquid crystal display device moves away from the z axis, the liquid crystal cannot be handled as an isotropic medium even under the OFF state. In other words, the birefringence cannot be neglected even under the OFF state and the leakage of light occurs. For this reason, a viewing angle is limited.

A uniaxial optical compensation cell 30 is employed for compensating for the optical anisotropy of a liquid crystal layer so that satisfactory display can be made over a wide range of viewing angle deviated from the z axis by improving the viewing angle. The optical properties of the liquid crystal layer 22 and the optical compensation cell 30 with the refractive indices nx, ny, nz and n'x, n'y, n'z in the axial directions x, y and z, respectively, have the following relations:

| liquid crystal cell | $nz > nx = ny$ |
|---|---|
| optical compensation cell | $n'z < n'x = n'y$ |

In other words, the refractive index distribution of the liquid crystal layer 22 is like a Rugby football which is elongated in the z axis direction as shown on the left-hand side of FIG. 6, while the refractive index distribution of the optical compensation cell 30 is like a tablet which is short in the z axis direction, contrary to the liquid crystal layer 22. A liquid crystal display device having a satisfactory viewing angle can be obtained by adjusting appropriately retardations of the liquid crystal layer 22 and the optical compensation cell 30.

Figure 7:
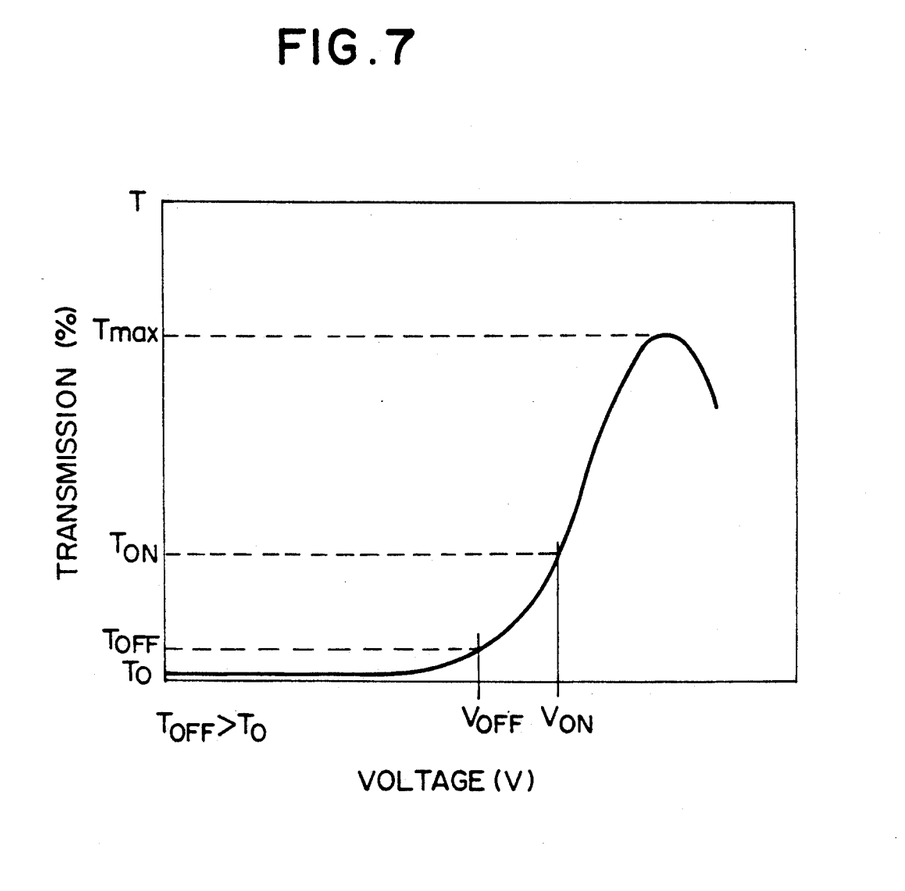
FIG. 7 is a diagram showing transmission vs. applied voltage characteristics in the conventional liquid crystal display device.

In a dot matrix liquid crystal display device using the conventional optical compensation cell as described above, a very small voltage (OFF voltage) is applied even when the device does not achieve display. Therefore, the direction of orientation of the molecules 25 in the liquid crystal layer 22 are inclined with a small tilt angle relative to the z axis, so that the leak of light occurs even under the OFF state and hence black level is deteriorated. In other words, a display contrast drops and display quality is deteriorated FIG. 7 shows transmission vs. voltage characteristics of a conventional liquid crystal display device. In the conventional device, the transmission does not become zero even under the OFF voltage ($V_{OFF}$) state.

Figure 8:
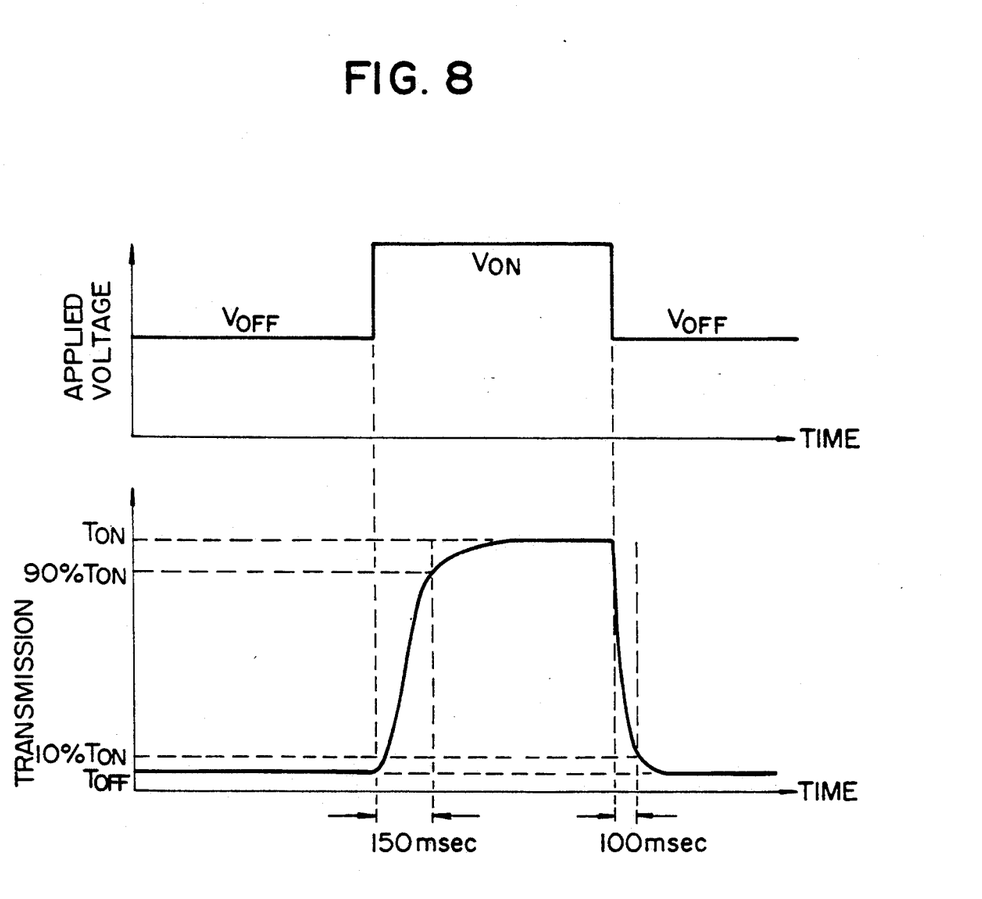
FIG. 8 is a diagram showing the change of the applied voltage and that of the transmission with time in the conventional liquid crystal display device.

FIG. 8 shows the change of the input voltage of the conventional liquid crystal display device and that of the transmission with time. Due to the leak of light $T_{OFF}$ at the time of OFF voltage ($V_{OFF}$), rise speed ($T_{OFF}-90\%$ $T_{ON}=150$ msec) is slower than fall speed ($T_{ON}-10\%$ $T_{OFF}=100$ msec).

Furthermore, in such a conventional liquid crystal display device, reflection of light occurs on the glass interface when the viewing angle is high, and the propagation mode of light varies, thereby causing asymmetry that the viewing angle is different on the right and left.

SUMMARY OF THE INVENTION

An object of the present invention is to provide a method of making an optical compensation device capable of reducing the leak of light in LCD at the time of OFF voltage, the LCD exhibiting a high response speed, being devoid of asymmetry of a viewing angle.

According to one aspect of the present invention, there is provided a production method of a biaxial optical device which comprises the steps of stretching an ionomer resin sheet to provide it with optical anisotropy, sandwiching the stretched ionomer resin sheet between two substrates, heating the ionomer resin sheet, stopping heating before the ionomer resin sheet becomes optically isotropic in the plane of sheet, and cooling the ionomer resin sheet.

A biaxial optical device can be fabricated by sandwiching the sheet of the stretched ionomer resin material between the substrates and heating them.

Optical compensation of a homeotropic liquid crystal can be carried out appropriately by the use of this optical device.

The present invention can thus provide a liquid crystal display device which has less leak of light at the time of OFF voltage, and has a high contrast and a high display quality.

Furthermore, the present invention can provide a liquid crystal display device which has high response and is devoid of asymmetry of viewing angle.

BRIEF DESCRIPTION OF THE DRAWINGS

FIGS. 9A and 9B are schematic diagrams for illustrating a method of manufacturing an optical compensator sheet according to an embodiment of this invention.

DESCRIPTION OF THE PREFERRED EMBODIMENTS

Figure 1:
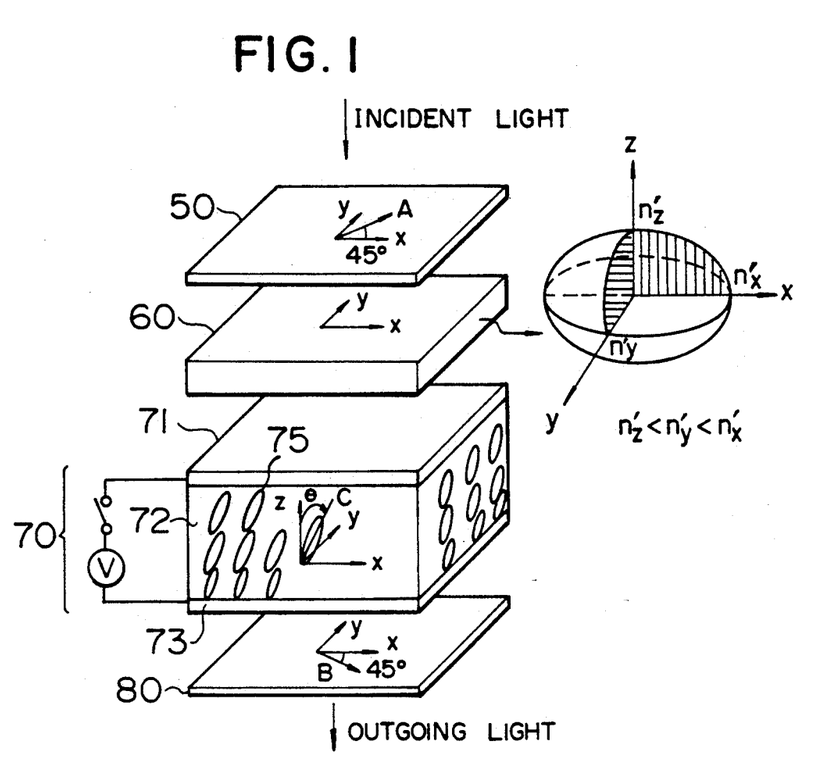
FIG. 1 is a perspective view showing diagramatically a structure of a liquid crystal display device according to an embodiment of the present invention.

FIG. 1 is an explanatory view for explaining the principle of display in one pixel in a liquid crystal display device using a biaxial optical compensation cell according to an embodiment of the invention.

In the drawing, $-z$ axis corresponds to a light transmission direction, and x and y axes cross orthogonally each other and also cross orthogonally the z axis. Polarizers 50 and 80 are disposed parallel to each other in such a fashion that their polarization axes (represented by arrows A and B) cross orthogonally each other. A homeotropic orientation type liquid crystal cell 70 is sandwiched between these polarizers 50 and 80. The liquid crystal cell 70 comprises transparent glass substrates 71 and 73 each equipped with transparent electrodes and disposed parallel to each other, and a liquid crystal layer 72 interposed between these substrates 71 and 73. Under the state where the voltage shown in FIG. 1 is not applied, molecules 75 of the liquid crystal 72 are aligned substantially in the light transmission direction (z axis) with a finite tilt angle. Therefore, the ray of light that is polarized by the polarizer 50 in the A direction is incident into the other polarizer 80 without receiving any action from the liquid crystal layer 72. Since the polarizing direction B of the polarizer 80 is orthogonal to the polarizing direction A of the polarizer 50, the incident light is blocked. When the pixel is viewed from the z axis direction of the liquid crystal display device, therefore, it appears dark. In the drawing, reference numeral 60 denotes a biaxial optical compensation cell, and its optical properties are so arranged to satisfy the following relationship with n'x, n'y and n'z representing the refractive indices in the x, y and z directions, respectively:

$$n'z < n'y < n'x.$$

The direction of the longitudinal axis of the liquid crystal molecules 75 does not coincide with the direction of the z axis at the time of an OFF voltage ($V_{OFF}$) but has a tilt angle $\theta$ toward the z-y plane with respect to the z axis. Both polarizers 50 and 80 are disposed in such a fashion that their polarization axes have an angle 45° with this tilt direction C. The direction of the longest axis n'x of the optical compensation cell 60 having the highest refractive index is so selected as to orthogonally cross the tilt direction C of the liquid crystal molecules 75.

Figure 2:
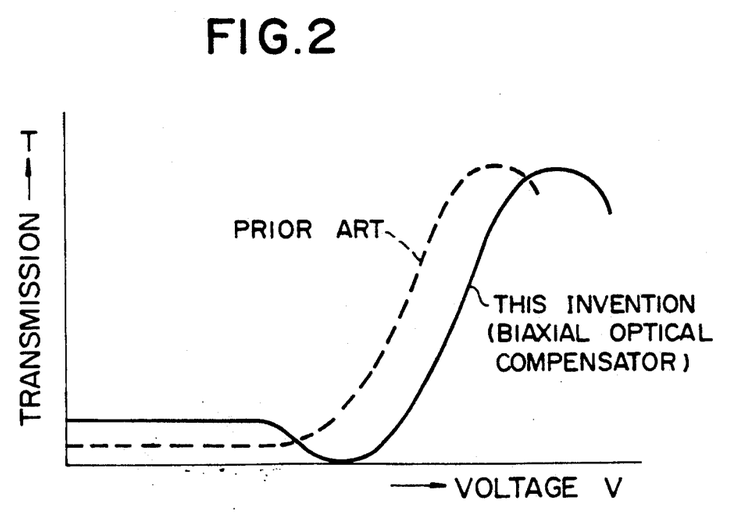
FIG. 2 is a diagram showing a relation of transmission vs. applied voltage characteristics of a liquid crystal display device according to an embodiment of the present invention.

FIG. 2 shows change of transmission in response to an applied voltage in the liquid crystal display device having the structure as shown in FIG. 1. Solid line represents the characteristics of the embodiment of the invention and dotted line represents the characteristics of the prior art shown for comparison. As is obvious from the diagram, the transmission relative to the impressed voltage rises monotonously in the prior art device. In contrast, the embodiment of the invention using the biaxial optical compensation cell and represented by sold line has a higher transmission at an initial stage. The transmission, however, drops thereafter and then increases again. The voltage at which the transmission reaches the smallest value is called "$V_{OFF}$". The transmission reaches substantially zero at the $V_{OFF}$ and thereafter increases with the increase of the voltage. Accordingly, the leak of light can be reduced and the contrast can be improved by driving the liquid crystal cell using this voltage, at which the transmission is minimal, as a voltage of a black level (OFF).

Figure 3:
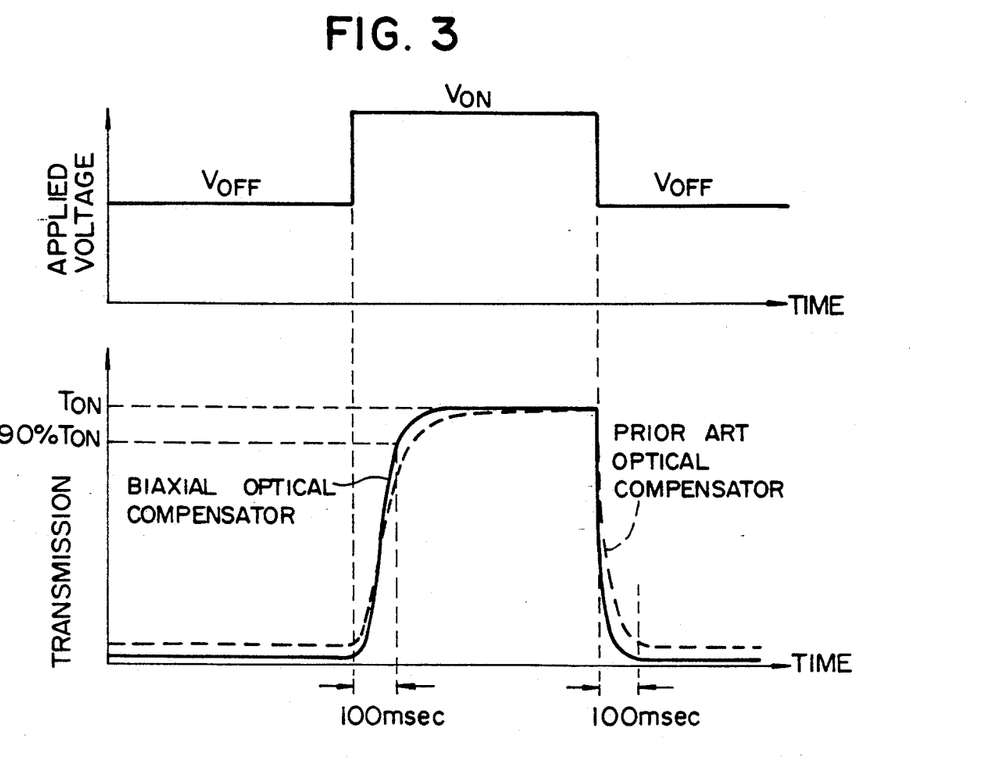
FIG. 3 is a diagram showing the change of the transmission with time according to an embodiment of the present invention.

FIG. 3 shows the change of the applied voltage and the transmission relative to the passage of time in an embodiment of the invention (represented by sold line) in comparison with that of the prior art device (represented by dotted line). It can be appreciated from the diagram that the transmission at the initial stage of rise in the embodiment is lower than that of the prior art device and the time necessary for reaching $T_{ON}$, i.e. the rise time, is shorter than that of the prior art device and is the same as the fall time.

Hereinbelow, embodiments of forming an optical compensator utilizing ion containing polymer sheet will be described.

As the ion containing polymer, ionomer resin is preferable used. The ionomer has such a structure in that at least part of the carboxyl group of ethylene-unsaturated carboxylic acid copolymer is neutralized by metal ions. It may also include other unsaturated compound polymer unit. The unsaturated carboxylic acid in ethylene-unsaturated carboxylic aid copolymer working as a base polymer of the ionomer preferably has carbon numbers of 3 to 8. More specifically, acrylic acid, methacrylic acid, itaconic acid, maleic acid, monomethyl maleate ester, monoethyl maleate ester, etc. may be used. Among these, acrylic acid and methacrylic acid are especially preferable.

Other unsaturated compound polymer units which may be included in the above-mentioned copolymer as arbitrary components include unsaturated carboxylic acid ester and saturated carboxylic acid vinyl ester, etc. More specifically, methyl acrylate, ethyl acrylate, isobutyl acrylate, n-butyl acrylate, 2-ethylhexyl acrylate, methyl methacrylate, ethyl methacrylate, vinyl acetate, etc. may be included as the polymer unit.

Considering the transparency, melting point, mechanical strength, etc. of the ionomer, the compositions of the respective polymerization components in the ethylene-unsaturated carboxylic aid copolymer are preferably as follows. Composition of ethylene is preferably 50–98% weight % and more preferably 60–96 weight %. Composition of unsaturated carboxylic acid is preferably 2–35 weight %, and more preferably 5–30 weight %. Other unsaturated compounds are preferably 0–40 weight %, and more preferably 0–20 weight %.

The metal ion in the ionomer is preferably selected alkaline such as lithium, sodium, potassium, etc. alkaline earth metal such as magnesium, calcium, etc. and metals of valency of 1–3 such as zinc, aluminium, etc. Two or more kinds of these metal ions may be concurrently used. Among these, magnesium and alkaline metal are more preferable, and particularly magnesium is preferable. The neutralization by these metal ions is 1–100%, and preferably 10–80%.

It is preferable to use such ionomer that has a melt flow rate of 0.01–200 g/10 min., especially 0.1–50 g/10 min. at 190° C. and 2160 gram weight application.

These ionomer may also include other unsaturated compound polymer unit. The composition may be adjusted by directly neutralizing ethylene-unsaturated carboxylic aid copolymer, saponifying ethylene-unsaturated carboxylic aid ester copolymer, etc.

First, an optical compensation element is manufactured by using an ion containing polymer sheet made of an ionomer material called HI-MILAN available from Mitsui Du-Pont Polychemical, Japan, or SURLYN available from Du-Pont, U.S.A.

Figure 9A:
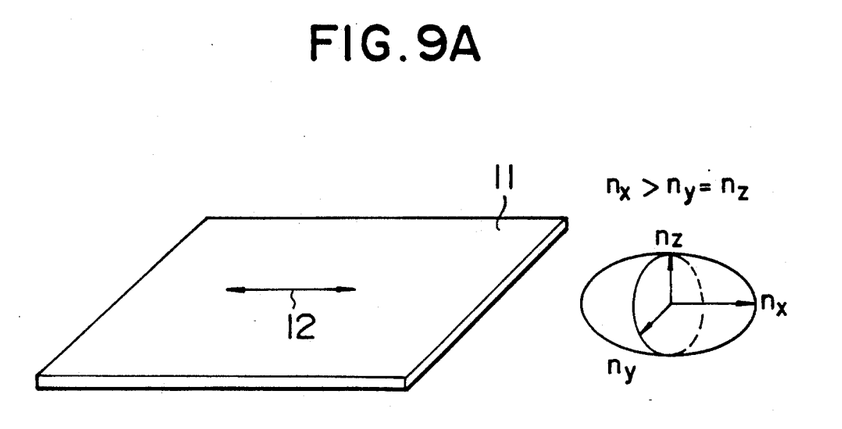
FIG. 9A is a perspective view for illustrating the stretching step.

An ion containing polymer sheet 11 made of HI-MILAN is stretched along one direction in the plane of sheet as shown in FIG. 9A. The stretched ion containing polymer sheet 11 becomes to have a refractive index $n'_x$ along the stretching direction 12 larger than refractive indices in other directions. Such refractive index distribution is shown on the righthand side of the figure. The refractive indices $n'_y$ and $n'_z$ along the directions perpendicular to the stretching direction x have almost the same values. Namely, the ion containing polymer sheet 11 has a uniaxial optical anisotropy having the optical axis in a direction in the plane of sheet. The thickness of the ion containing polymer sheet can also be adjusted in this step. It is preferable to adjust the thickness of the sheet within ±5% of a desired value.

Figure 9B:
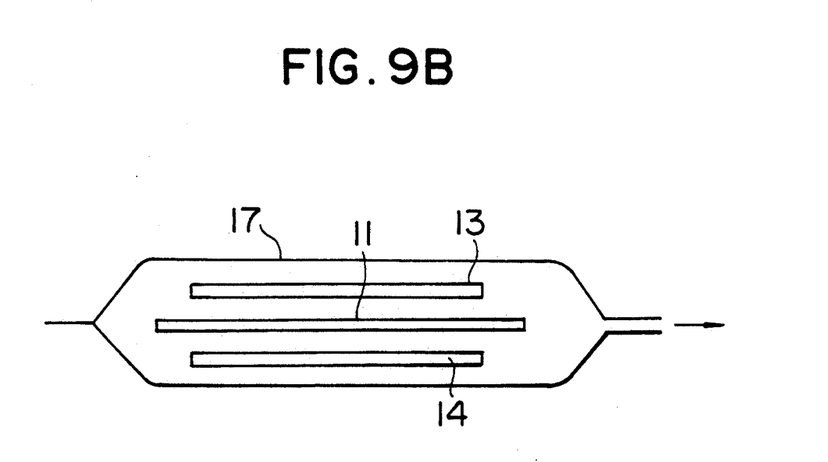
FIG. 9B is a schematic cross section for illustrating the heating and pressing step.

The ion containing polymer sheet 11, thus stretched is sandwiched between a pair of parallel glass plates 13 and 14 and contained in an evacuatable heat-resisting hermetic bag 17, as shown in FIG. 9B. The bag is then evacuated and sealed. The sealed bag is loaded in an autoclave furnace and subjected to heat and pressure application treatment.

The substrates may be left as such. Alternatively, one or both, of the substrates may be removed after production. If both of them are removed, the substrates to be used need not be transparent.

Next, the vacuum packed bag is heated at a predetermined pressure. The heating temperature is above the melting point of the ionomer resin (80° C. or above in the case of HI-MILAN or SURLYN).

After heat and pressure application treatment, the hermetic bag 17 is taken out from the autoclave furnace and cooled.

Before heating, this ionomer resin in the sheet form has such refractive indices n'x and n'y satisfying the relation n'x>n'y with x representing the stretching direction (and y being the other direction in the plane of sheet).

The refractive indices $n'_x$, $n'_y$ and $n'_z$ of the ion containing polymer sheet vary gradually depending on the heating temperature, heating time, applied pressure, cooling condition, etc. of this treatment.

For example, when the ion containing polymer sheet made of HI-MILAN is treated at or above the melting point for sufficiently a long time, a negative uniaxial optical anisotropy of $n'_{x=n'y>n'z}$ will be exhibited.

An intermediate state between n'x>n'y=n'z and n'x=n'y>n'z, that is, biaxial property of n'x>n'y>n'x, can be obtained by suitably adjusting the heating time or the heating temperature or both. When heated, the ionomer resin becomes soft and when the ionomer resin sheet is pressed, bubbles remaining between the transparent substrates are emitted outside.

After heating under the predetermined condition, the pressure is released, and the hermetic bag is taken out from the autoclave furnace and cooled. After cooling, the assembly is taken out from the vacuum pack. Its is considered that the resin undergoes shrinkage during cooling, and the refractive index n'z in the z axis direction becomes the lowest.

Figure 4:
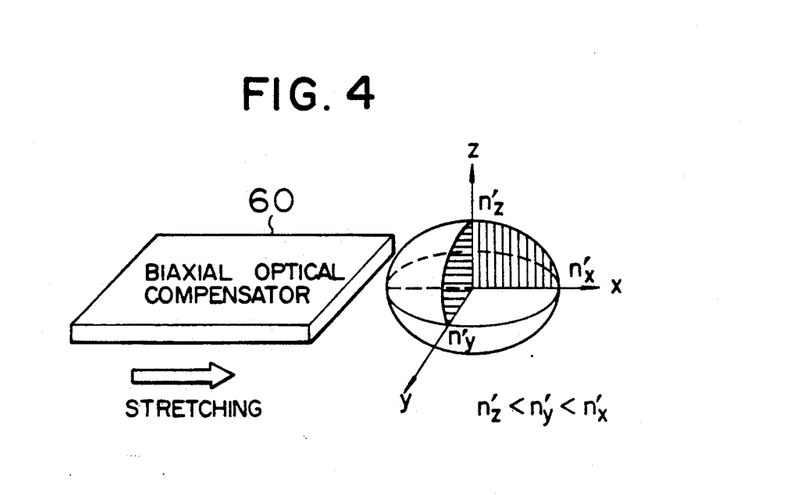
FIG. 4 is a diagram showing the relation between a sheet stretching direction and refractive index distribution in an optical compensation cell according to an embodiment of the present invention.

FIG. 4 shows the relationship in the biaxial optical compensation cell between the stretching direction of the sheet and the refractive index after the heat and pressure treatment in the embodiment of the present invention.

Figure 5:
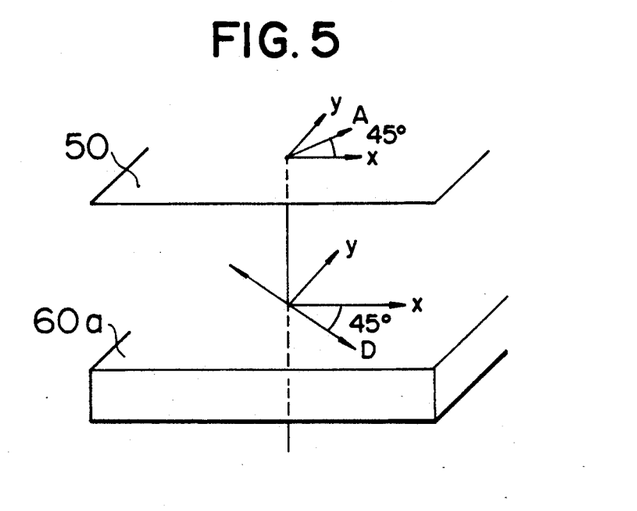
FIG. 5 is a perspective view showing a partial structure of the liquid crystal display device according to another embodiment of the present invention.

Furthermore, it has been experimentally confirmed that transverse asymmetry of the viewing angle can be improved by setting the stretching direction D of the optical compensation cell 60a (the direction of the greatest refractive index n'x) at the angle of about 45° to the x axis direction shown in FIG. 1, as depicted in FIG. 5.

The arrangement in which the compensation plates are asymmetric to the right and left is believed effective.

Approximate values of the optical anisotropy $(n_x - n_z = \Delta n)$ obtained in the experiment for the cases of using various ionomer resins are listed in the following table. Here, as references, other elements were also manufactured using materials other than the ion containing polymer and through similar manufacturing process, and measured their characteristics. These references are also listed in the table.

In other experiment, AD7940 (trade name available from Mitsui Du Pont Polychemical) of Li ion type is treated in a similar manner and anisotropy $\Delta n$ of $0.9 \times 10^{-3}$ was obtained.

Comparing ionomers of Na ion type and Mg ion type, Na ion type ionomers have a tendency that ion species may remain as crystals in the sheet, and ionomers of mg ion type are easier to handle. Except the materials of ion containing polymer, no negative optical anisotropy $n_x \times n_y > n_z$ was obtained.

The value of optical anisotropy was especially high in HI-MILAN 1601 and HI-MILAN 1555.

From the viewpoint of transparency, HI-MILAN 1707 and HI-MILAN AM7311 were especially superior. HI-MILAN 1601 and HI-MILAN 1605 showed good results.

TABLE

| material | $\Delta n$ |
| --- | --- |
| HI-MILAN 1601 (Na ion type) | $-1.4 \times 10^{-3}$ |
| HI-MILAN 1605 (Na ion type) | $-0.9 \times 10^{-3}$ |
| HI-MILAN 1555 (Na ion type) | $-1.3 \times 10^{-3}$ |
| HI-MILAN 1707 (Na ion type) | $-0.9 \times 10^{-3}$ |
| HI-MILAN AM7311 (Mg ion type) | $-0.9 \times 10^{-3}$ |
| Polycarbonate | x |
| polystyrene | x |
| methyl methacrylate | x |
| Nucrel (Du-Pont) | x |
| S-LEC (Sekisui Chemical) | x |

As is apparent from the above embodiment, it is possible to obtain a negative optical anisotropy $n_x > n_y > n_z$ having an optical axis perpendicular to the plane of sheet, by using ion containing polymer as the raw material and performing a predetermined treatment thereon. It is possible to get biaxial birefringence having a degree of anisotropy $|n_x - n_y|/n_x > 0.01$, for example a retardation of over 100 nm in a film of a thickness 3 μm. It is found that anisotropy as shown in FIG. 9A changes continuously into the biaxial anisotropy.

The above-mentioned characteristics were not found up till now in other polymer materials.

Among the ion containing polymers, resins formed by ion-bridging ethyl and methacrylic acid copolymer showed good results. Especially, HI-MILAN 1601 has a large value of Δn and can reduce the thickness of the sheet when used as an optical compensator. HI-MILAN 1707 and HI-MILAN AM7311 have superior transparency, and enables high contrast when used in a liquid crystal display device.

In the above description Mi-MILAN (Mitsui DuPont Polychemical, Japan) and SURLYN (DuPont, USA) are ionomer resins, NUCREL (DuPont, USA) is an ethylene copolymer, and S-LEC (Sekisui Chemical, Japan) is a butyral resin. All are trademarks.

Although the present invention has thus been described with reference to some embodiments thereof, the present invention is not limited thereto. It would therefore be obvious to those skilled in the art that various changes, modifications, improvements and combinations thereof can be made within the scope of the invention.

We claim:

1. A method of producing a biaxial optical compensator, comprising the successive steps of:
   (a) stretching an ion-containing polymer sheet to impart optical anisotropy thereto;
   (b) sandwiching the thus stretched ion-containing polymer sheet between two substrates while maintaining the optical anisotropy;
   (c) heating the ion containing polymer sheet;
   (d) discontinuing heating before the stretched ion-containing polymer sheet becomes optically isotropic; and thereafter
   (e) cooling the ion-containing polymer sheet thereby obtaining an optically biaxial sheet.

2. The method according to claim 1, wherein the ion-containing polymer is an ionomer resin.

3. The method according to claim 2, wherein the ionomer resin has ethylene-methacrylate copolymer bridged with metal ions.

4. The method according to claim 2, wherein heating step (c) includes pressing the ionomer resin sheet between the two substrates.

5. The method according to claim 2, wherein heating step (c) is conducted in an autoclave furnace.

* * * * *